United States Patent
Prakash (10) Patent No.: US 11,665,211 B2
(45) Date of Patent: May 30, 2023

(54) APPARATUSES AND METHODS FOR CALL ADDITION CONTROL

(71) Applicant: MediaTek Singapore Pte. Ltd., Singapore (SG)

(72) Inventor: Prabhath Maradapalli Prakash, Bengaluru (IN)

(73) Assignee: MEDIATEK SINGAPORE PTE. LTD., Singapore (SG)

(*) Notice: Subject to any disclaimer, the term of this patent is extended or adjusted under 35 U.S.C. 154(b) by 152 days.

(21) Appl. No.: 17/366,371

(22) Filed: Jul. 2, 2021

(65) Prior Publication Data

US 2022/0141264 A1    May 5, 2022

(51) Int. Cl.
| | |
|---|---|
| H04L 65/1093 | (2022.01) |
| H04W 8/28 | (2009.01) |
| H04L 65/1076 | (2022.01) |
| H04L 65/1104 | (2022.01) |
| H04W 84/12 | (2009.01) |

(52) U.S. Cl.
CPC ...... *H04L 65/1093* (2013.01); *H04L 65/1076* (2013.01); *H04L 65/1104* (2022.05); *H04W 8/28* (2013.01); *H04W 84/12* (2013.01)

(58) Field of Classification Search
CPC ............. H04L 65/1093; H04L 65/1104; H04L 65/1076; H04W 8/28; H04W 84/12
See application file for complete search history.

(56) References Cited

U.S. PATENT DOCUMENTS

| | | | |
|---|---|---|---|
| 9,730,262 B2 | 8/2017 | Lee | |
| 11,343,288 B2 | 5/2022 | Mufti et al. | |
| 2007/0286372 A1* | 12/2007 | DeMent | H04M 15/06 379/142.01 |
| 2012/0321058 A1* | 12/2012 | Eng | H04L 65/80 379/90.01 |
| 2016/0014578 A1* | 1/2016 | Kadiyala | H04W 4/06 455/414.1 |
| 2016/0029197 A1 | 1/2016 | Gellens | |

FOREIGN PATENT DOCUMENTS

| | | |
|---|---|---|
| CN | 105764040 A | 7/2016 |
| CN | 107113294 A | 8/2017 |

OTHER PUBLICATIONS

Chinese language office action dated Jun. 21, 2022, issued in application No. TW 110135031.

* cited by examiner

*Primary Examiner* — Duc C Ho (74) *Attorney, Agent, or Firm* — McClure, Qualey & Rodack, LLP (57) ABSTRACT

A method for call addition control in a User Agent (UA) or a call service system is provided. The UA or the call service system receives or initiates a call addition request comprising information of a called party during a call. The UA or the call service system determines whether the called party is already present in the call. The UA or the call service system blocks the call addition request in response to the called party being already present in the call.

20 Claims, 9 Drawing Sheets

APPARATUSES AND METHODS FOR CALL ADDITION CONTROL

CROSS REFERENCE TO RELATED APPLICATIONS

This application claims priority of India Provisional Application No. 202021047765, entitled "CORRECTING ANOMALY IN CONFERENCE/NORMAL CALL CELLULAR SYSTEMS", filed on Nov. 2, 2020, the subject matter of which is incorporated herein by reference.

BACKGROUND OF THE APPLICATION

Field of the Application

The application generally relates to call services, and more particularly, to apparatuses and methods for call addition control.

Description of the Related Art

In a typical mobile communication environment, a User Equipment (UE) (also called a Mobile Station (MS)), such as a mobile telephone (also known as a cellular or cell phone), or a tablet Personal Computer (PC) with wireless communication capability may communicate voice and/or data signals with one or more cellular networks. The wireless communication between the UE and the cellular networks may be performed using various Radio Access Technologies (RATs), such as Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, etc. In particular, GSM/GPRS/EDGE technology is also called 2G technology; WCDMA/CDMA-2000/TD-SCDMA technology is also called 3G technology; and LTE/LTE-A/TD-LTE technology is also called 4G technology.

These RAT technologies have been adopted for use in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the Third Generation Partnership Project (3GPP). It is designed to better support mobile broadband Internet access by improving spectral efficiency, reducing costs, and improving services.

In a 4G/5G network, an IP Multimedia Subsystem (IMS) may be deployed to provide a reliable way of establishing a signaling plane between two or more UEs. For example, call service, including individual calls (i.e., calls between two parties) and conference calls (calls between more than 2 parties), data can be transmitted over this signaling plane to provide reliability and dedicated Quality of Service (QoS). Alternatively, individual/conference calls may be made over landlines, Wireless-Fidelity (Wi-Fi) networks, or any other access networks, instead of the 4G/5G network.

However, in an individual/conference call, the addition of a call to one of the called/caller party is not restricted, and there may be situations where one of the called/caller party is added repeatedly to the same call. Consequently, the repeated call addition will result in echoes in the call, not to mention an unnecessary waste of resources/bandwith in the system.

A solution is sought to solve the above problem.

BRIEF SUMMARY OF THE APPLICATION

The present application aims to solve the aforementioned problem by introducing controls over call addition requests in a User Agent (UA) or a call service system to prevent an existing called/caller party of a call from being added repeatedly to the same call.

In one aspect of the application, a method is provided, which comprises the following steps: receiving or initiating, by a UA, a call addition request comprising information of a called party during a call; determining, by the UA, whether the called party is already present in the call; and blocking, by the UA, the call addition request in response to the called party being already present in the call.

In another aspect of the application, a UA comprising a transceiver and a controller is provided. The transceiver is configured to perform transmission and reception to and from a communication network. The controller is coupled to the transceiver, and is configured to initiate or join a call through the communication network, receive or initiate a call addition request comprising information of a called party during the call, determine whether the called party is already present in the call, and block the call addition request in response to the called party being already present in the call.

In yet another aspect of the application, a method is provided, which comprises the following steps: receiving or initiating, by a call service system, a call addition request comprising information of a called party from a UA during a call; determining, by the call service system, whether the called party is already present in the call; and blocking, by the call service system, the call addition request in response to the called party being already present in the call.

In one example, the call is associated with a plurality of first party identifiers, and the determination of whether the called party is already present in the call comprises: determining a second party identifier of the called party; and determining whether the first party identifiers comprise the second party identifier. Each of the first party identifiers comprises a Uniform Resource Identifier (URI), and the second party identifier is a request URI in the call addition request which is a Session Initiation Protocol (SIP) Invite message. Alternatively, each of the first party identifiers comprises an International Mobile Equipment Identity (IMEI), and the second party identifier is an IMEI in a Contact header field of the call addition request which is an SIP Invite message.

In one example, the UA initiates or joins the call through a landline or a wireless communication network comprising a Wireless-Fidelity (Wi-Fi) network or a cellular network.

In one example, the UA initiates or joins the call using a first subscriber identity, and the call addition request is received or initiated using the first subscriber identity or a second subscriber identity.

In one example, the call is coordinated by a call service system. The call service system may comprise an IP Multimedia Subsystem (IMS) network.

Other aspects and features of the present application will become apparent to those with ordinary skill in the art upon review of the following descriptions of specific embodiments of the apparatuses and methods for call addition control.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
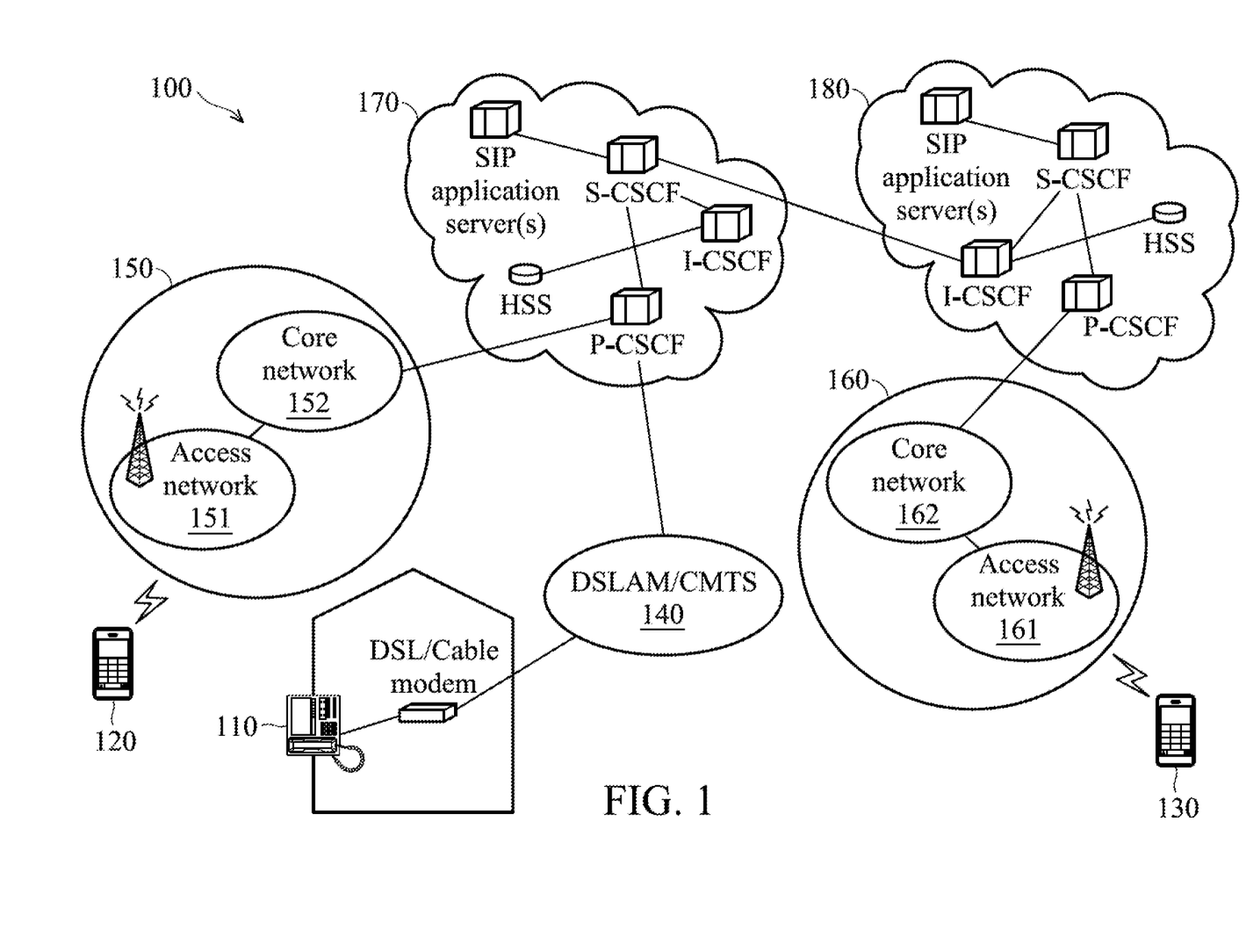
FIG. 1 is a block diagram of IMS architecture according to an embodiment of the application.

FIG. 1 is a block diagram of IMS architecture according to an embodiment of the application.

As shown in FIG. 1, the IMS architecture 100 includes a plurality of User Agents (UAs) 110~130, a wired communication network 140, two wireless communication networks 150~160, and two IMS networks 170~180.

Each of the UAs 110~130 may be a landline phone, a mobile phone (e.g., feature phone or smartphone), a panel Personal Computer (PC), a laptop computer, a desktop computer, or any device with a call processing functionality. For example, the UA 110 may be a landline phone or desktop computer which can connect to the IMS network 170 via the wired communication network 140, and make an individual call to either the UA 120 or the UA 130 or a conference call to both the UAs 120 and 130. The UA 120 may be a mobile phone which can connect to the IMS network 170 via the wireless communication network 150, and make an individual call to either the UA 110 or the UA 130 or a conference call to both the UAs 110 and 130. The UA 130 may be a mobile phone which can connect to the IMS network 180 via the wireless communication network 160, and make an individual call to either the UA 110 or the UA 120 or a conference call to both the UAs 110 and 120.

The wired communication network 140 may be a Digital Subscriber Line (DSL) network, an Asymmetric Digital Subscriber Line (ADSL) network, a cable network, or a fiber optic network, which provides wired access to the IMS network 170 and/or the Internet. For example, the UA 110 may connect to the wired communication network 140 via a DSL/cable modem or a Wi-Fi Access Point (AP).

The wireless communication network 150 may be a cellular network including an access network 151 and a core network 152, while the wireless communication network 160 may be a cellular network including an access network 161 and a core network 162. Each of the access networks 151 and 161 is responsible for processing radio signals, terminating radio protocols, and connecting the UA 120/130 with the core network 152/162, while each of the core networks 152 and 162 is responsible for performing mobility management, network-side authentication, and interfaces with public/external networks (e.g., the IMS network 170/180 and/or the Internet).

In one embodiment, if the wireless communication network 150/160 is a 4G network (e.g., an LTE/LTE-A/TD-LTE network), the access network 151/161 may be an Evolved-Universal Terrestrial Radio Access Network (E-UTRAN) and the core network 152/162 may be an Evolved Packet Core (EPC). The E-UTRAN may include at least an evolved NodeB (eNB) (e.g., a macro eNB, femto eNB, or pico eNB). The EPC may include a Home Subscriber Server (HSS), Mobility Management Entity (MIME), Serving Gateway (S-GW), and Packet Data Network Gateway (PDN-GW or P-GW).

In one embodiment, if the wireless communication network 150/160 is a 5G network (e.g., an NR network), the access network 151/161 may be a Next Generation Radio Access Network (NG-RAN) and the core network 152/162 may be a Next Generation Core Network (NG-CN). The NG-RAN may include one or more gNBs. Each gNB may further include one or more Transmission Reception Points (TRPs), and each gNB or TRP may be referred to as a 5G cellular station. Some gNB functions may be distributed across different TRPs, while others may be centralized, leaving the flexibility and scope of specific deployments to fulfill the requirements for specific cases. The NG-CN may support various network functions, including an Access and Mobility Management Function (AMF), a Session Management Function (SMF), a User Plane Function (UPF), a Policy Control Function (PCF), an Application Function (AF), an Authentication Server Function (AUSF), and a Non-3GPP Inter-Working Function (N3IWF), wherein each network function may be implemented as a network element on dedicated hardware, or as a software instance running on dedicated hardware, or as a virtualized function instantiated on an appropriate platform, e.g., a cloud infrastructure.

Each of the IMS networks 170 and 180 is a call service system consisting of various network functions for providing IP multimedia services to the UAs 110~130 over the wired communication network 140 and the wireless communication networks 150~160. For example, each of the IMS networks 170 and 180 may include an IMS core which at least includes a Home Subscriber Server (HSS), a Call Session Control Function (CSCF), a Signaling Gateway (SGW), a Media Gateway Control Function (MGCF), and a Media Resource Function (MRF), wherein each network function may be implemented as a network element on dedicated hardware (e.g., a computing device, a server, or a processing circuit of a processor in a computing device or server), or as a software instance running on dedicated hardware, or as a virtualized function instantiated on an appropriate platform, e.g., a cloud infrastructure. The HSS generally refers to the master database that maintains all user profile information used to authenticate and authorize subscribers. The CSCF is the heart of the IMS architecture, which is responsible for controlling sessions between endpoints (referred to as terminals in the IMS specifications) and applications. The CSCF function is distributed across three types of functional elements, including Proxy CSCF (P-CSCF), Interrogating CSCF (I-CSCF), and Serving CSCF (S-CSCF), based on the specialized function they perform. The SGW and the MGCF are responsible for providing interoperability with the Public Switched Telephone Network (PSTN). The MRF provides media-related functions such as the playing of tones and digital announcements.

The IP multimedia services provided by the IMS networks 170~180 at least includes call services, such as Voice over LTE (VoLTE), Video over LTE (ViLTE), Voice over NR (VoNR), and Video over NR (ViNR), etc. In addition, the IP multimedia services may also include data services, such as Short Message Service (SMS) over IMS, Mission Critical Push To Talk (MCPTT), Mission Critical Video (MCVideo), Mission Critical Data (MCData), Rich Communication Services (RCS), XML Configuration Access Protocol (XCAP), and others.

In accordance with one novel aspect, controls over call addition requests are introduced in the UA side or the IMS network side. Specifically, a UA or an IMS network may check to see whether the called party of each call addition request is already present in the current call, and block the call addition request if the called party is already present in the call. Advantageously, undesired echoes and unnecessary waste of resources caused by repeated call addition can be prevented.

Figure 2:
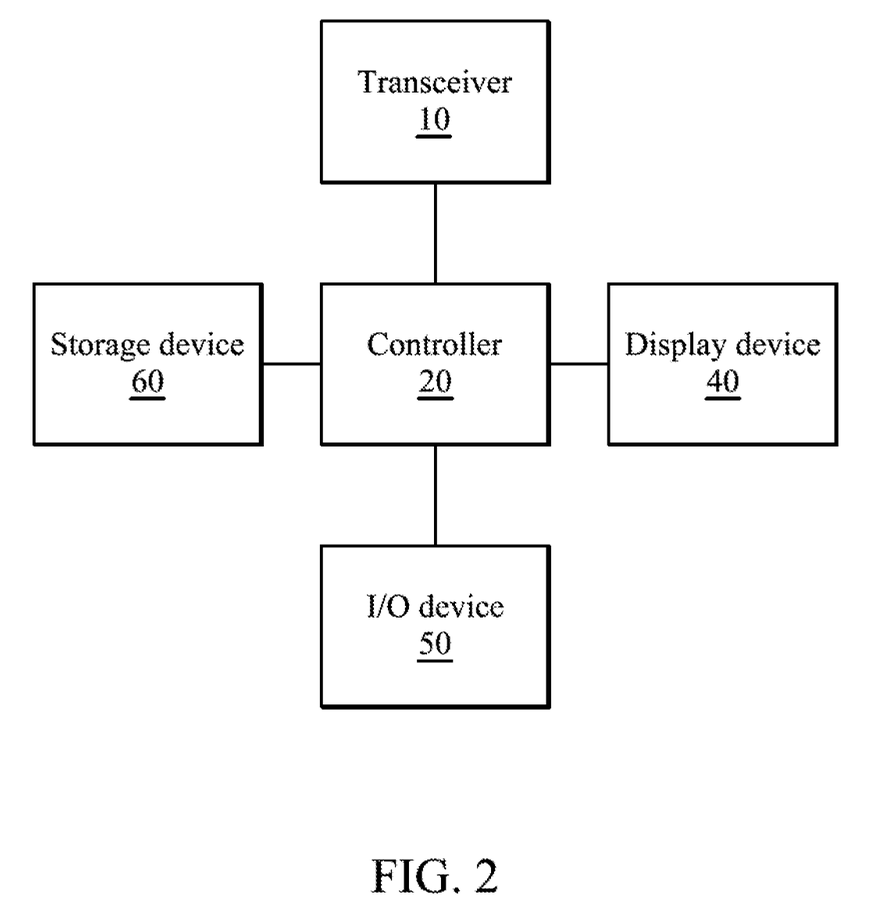
FIG. 2 is a block diagram illustrating a UA according to an embodiment of the application.

FIG. 2 is a block diagram illustrating a UA according to an embodiment of the application.

As shown in FIG. 2, a UA may include a transceiver 10, a controller 20, a storage device 30, a display device 40, and an Input/Output (I/O) device 50.

The transceiver 10 is configured to perform transmission and reception to and from the wired communication network 140 or the wireless communication network 150/160. In one embodiment, the transceiver 10 is a wired transceiver which may include a network interface card (e.g., an Ethernet adapter) to provide the function of wired transmission and reception. In another embodiment, the transceiver 10 is a wireless transceiver which may include a baseband processing device, a Radio Frequency (RF) device, and an antenna, wherein the antenna may include an antenna array for beamforming, depending on the RAT in use.

The baseband processing device is configured to perform baseband signal processing and control the communications between subscriber identity card(s) and the RF device. The baseband processing device may contain multiple hardware components to perform the baseband signal processing, including Analog-to-Digital Conversion (ADC)/Digital-to-Analog Conversion (DAC), gain adjusting, modulation/demodulation, encoding/decoding, and so on.

The RF device may receive RF wireless signals via the antenna, convert the received RF wireless signals to baseband signals, which are processed by the baseband processing device, or receive baseband signals from the baseband processing device and convert the received baseband signals to RF wireless signals, which are later transmitted via the antenna. The RF device may also contain multiple hardware devices to perform radio frequency conversion. For example, the RF device may include a mixer to multiply the baseband signals with a carrier oscillated in the radio frequency of the supported cellular technologies, wherein the radio frequency may be 900 MHz, 2100 MHz, or 2.6 GHz utilized in 4G (e.g., LTE/LTE-A/TD-LTE) systems, or may be any radio frequency (e.g., 30 GHz~300 GHz for mmWave, or 3.3 GHz~4.9 GHz for sub-6) utilized in 5G (e.g., NR) systems, or another radio frequency, depending on the RAT in use.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the transceiver 10 for transceiving with the wired communication network 140 or the wireless communication network 150/160, enabling the storage device 30 for storing and retrieving data, sending a series of frame data (e.g. representing text messages, graphics, images, etc.) to the display device 40, and receiving/outputting signals from/to the I/O device 50.

In particular, the controller 20 coordinates the aforementioned operations of the transceiver 10, the storage device 30, the display device 40, and the I/O device 50 for performing the method for call addition control.

In another embodiment, the controller 20 may be incorporated into the baseband processing device, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 is a non-transitory computer-readable storage medium, including a memory (e.g., a FLASH memory or a Non-Volatile Random Access Memory (NVRAM)), a magnetic storage device (e.g., a hard disk or a magnetic tape), or an optical disc, or any combination thereof for storing data, instructions, and/or program code of applications, communication protocols, and/or the method of the present application.

The display device 40 may be a Liquid-Crystal Display (LCD), a Light-Emitting Diode (LED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MMI) for interaction with users, such as receiving user inputs, and outputting prompts to users.

It should be understood that the components described in the embodiment of FIG. 2 are for illustrative purposes only and are not intended to limit the scope of the application. For example, a UA may include more components, such as a power supply, or a Global Positioning System (GPS) device, wherein the power supply may be a mobile/replaceable battery providing power to all the other components of the UA, and the GPS device may provide the location information of the UA for use of some location-based services or applications. Alternatively, a UA may include fewer components. For example, the UA may not include the display device 40 and/or the I/O device 50.

Figure 3:
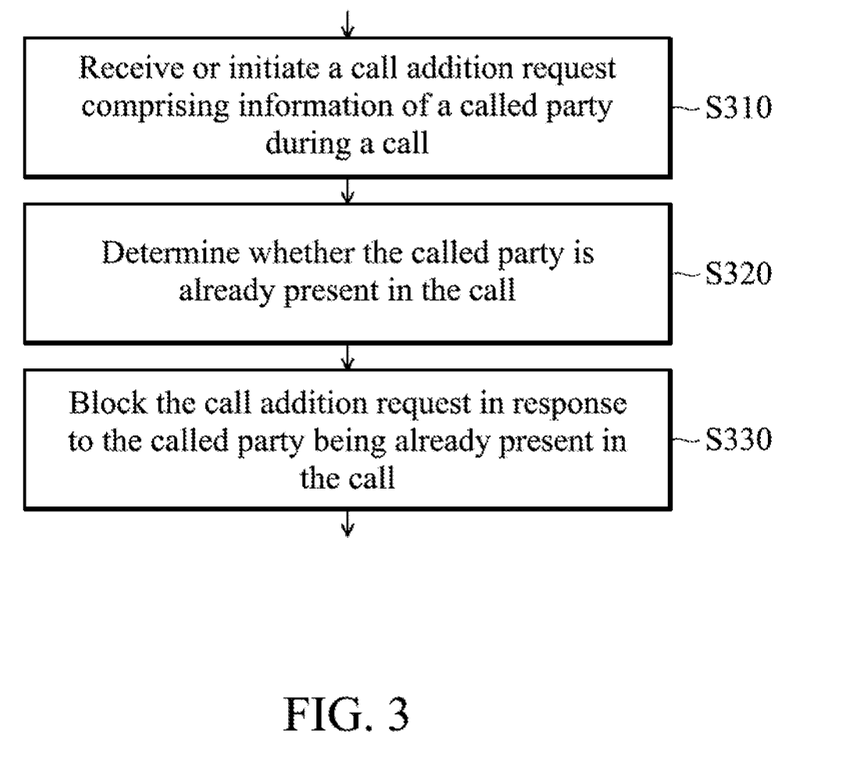
FIG. 3 is a flow chart illustrating the method for call addition control in a UA according to an embodiment of the application.

FIG. 3 is a flow chart illustrating the method for call addition control in a UA according to an embodiment of the application.

In this embodiment, the method for call addition control is applied to and executed by a UA (e.g., the UA 110/120/130).

In step S310, the UA receives or initiates a call addition request comprising information of a called party during a call.

The UA may initiate or join the call through a landline or a wireless communication network comprising a Wi-Fi network or a cellular network, and the call is coordinated by a call service system (e.g., an IMS network).

In one example, the UA may be a multi-Subscriber Identity Module (SIM) mobile phone which may initiate or join the call using a first subscriber identity (e.g., a first SIM), and the call addition request is received or initiated using the first subscriber identity or a second subscriber identity (e.g., a second SIM).

In step S320, the UA determines whether the called party is already present in the call.

Specifically, the call is associated with a plurality of first party identifiers, and the UA may determine whether the called party is already present in the call, by determining a second party identifier of the called party and determining whether the first party identifiers comprise the second party identifier.

In one example, each of the first party identifiers comprises a Uniform Resource Identifier (URI), and the second party identifier is a request URI in the call addition request which is a Session Initiation Protocol (SIP) Invite message.

In another example, each of the first party identifiers comprises an International Mobile Equipment Identity (IMEI), and the second party identifier is an IMEI in a Contact header field of the call addition request which is an SIP Invite message.

In step S330, the UA blocks the call addition request in response to the called party being already present in the call.

Figure 4:
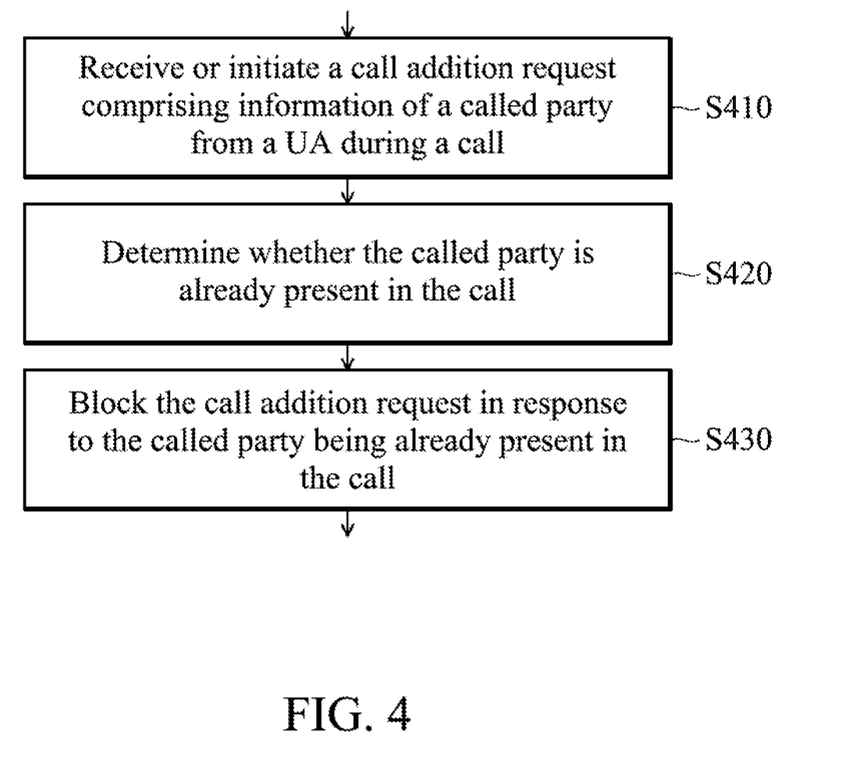
FIG. 4 is a flow chart illustrating the method for call addition control in a call service system according to another embodiment of the application.

FIG. 4 is a flow chart illustrating the method for call addition control in a call service system according to another embodiment of the application.

In this embodiment, the method for call addition control is applied to and executed by a call service system (e.g., the IMS network 170/180).

In step S410, the call service system receives or initiates a call addition request comprising information of a called party from a UA during a call.

In step S420, the call service system determines whether the called party is already present in the call.

Specifically, the call is associated with a plurality of first party identifiers, and the UA may determine whether the called party is already present in the call, by determining a second party identifier of the called party and determining whether the first party identifiers comprise the second party identifier.

In one example, each of the first party identifiers comprises a URI, and the second party identifier is a request URI in the call addition request which is a SIP Invite message.

In another example, each of the first party identifiers comprises an IMEI, and the second party identifier is an IMEI in a Contact header field of the call addition request which is an SIP Invite message.

In step S430, the call service system blocks the call addition request in response to the called party being already present in the call.

Figure 5A:
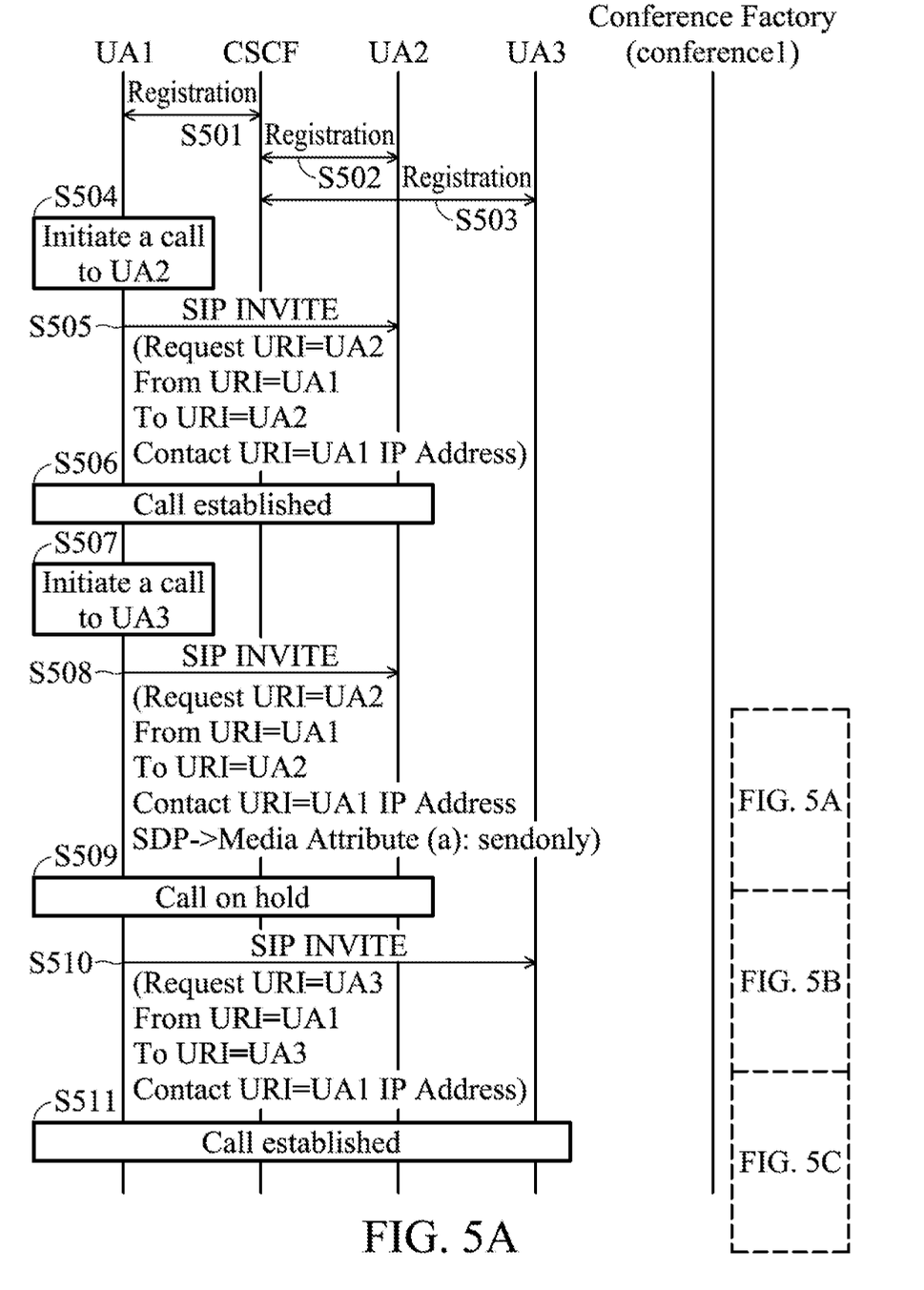
FIGS. 5A~5C show a message sequence chart illustrating the call setup flow with call addition control according to an embodiment of the application.
Figure 5B:
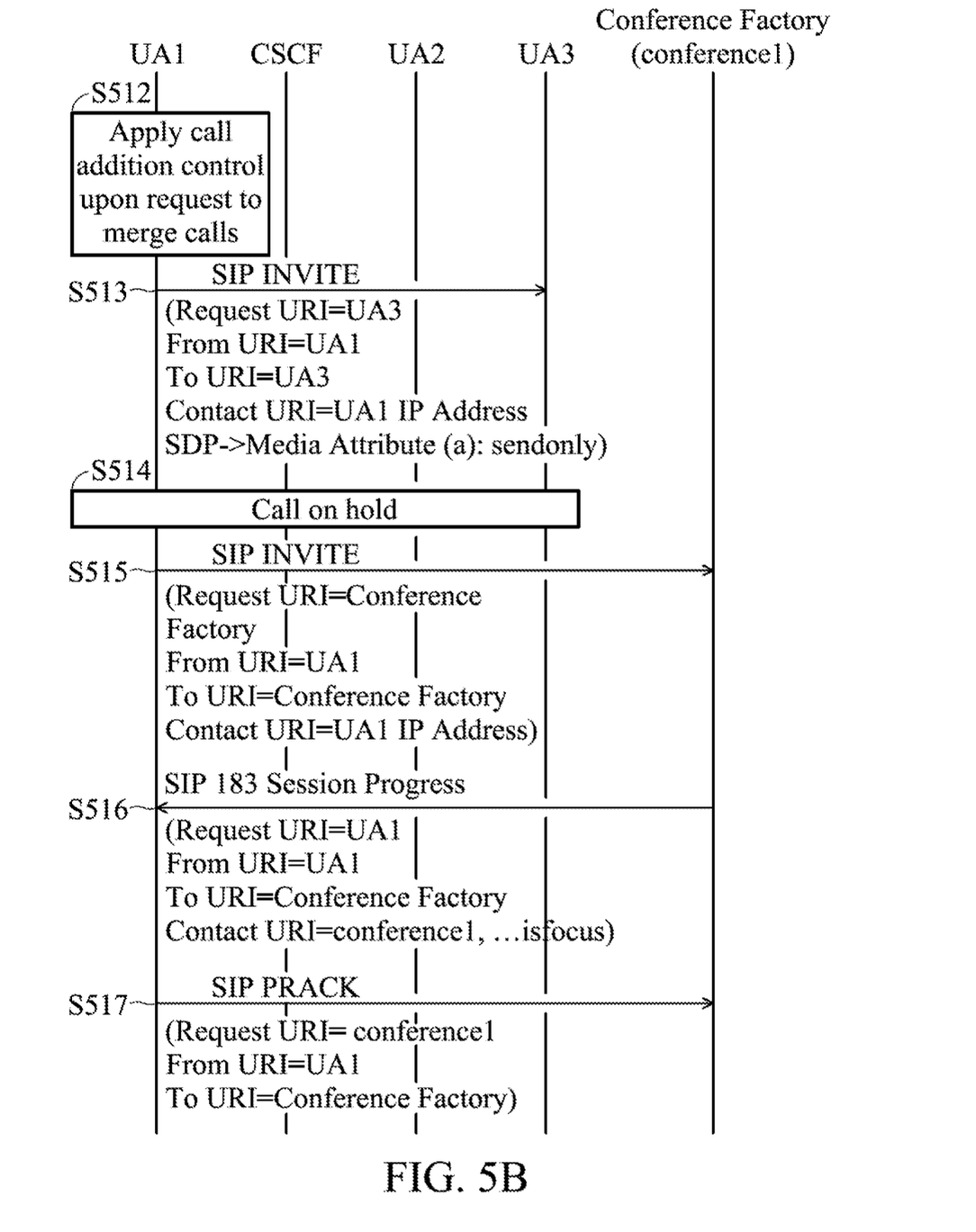
Figure 5C:
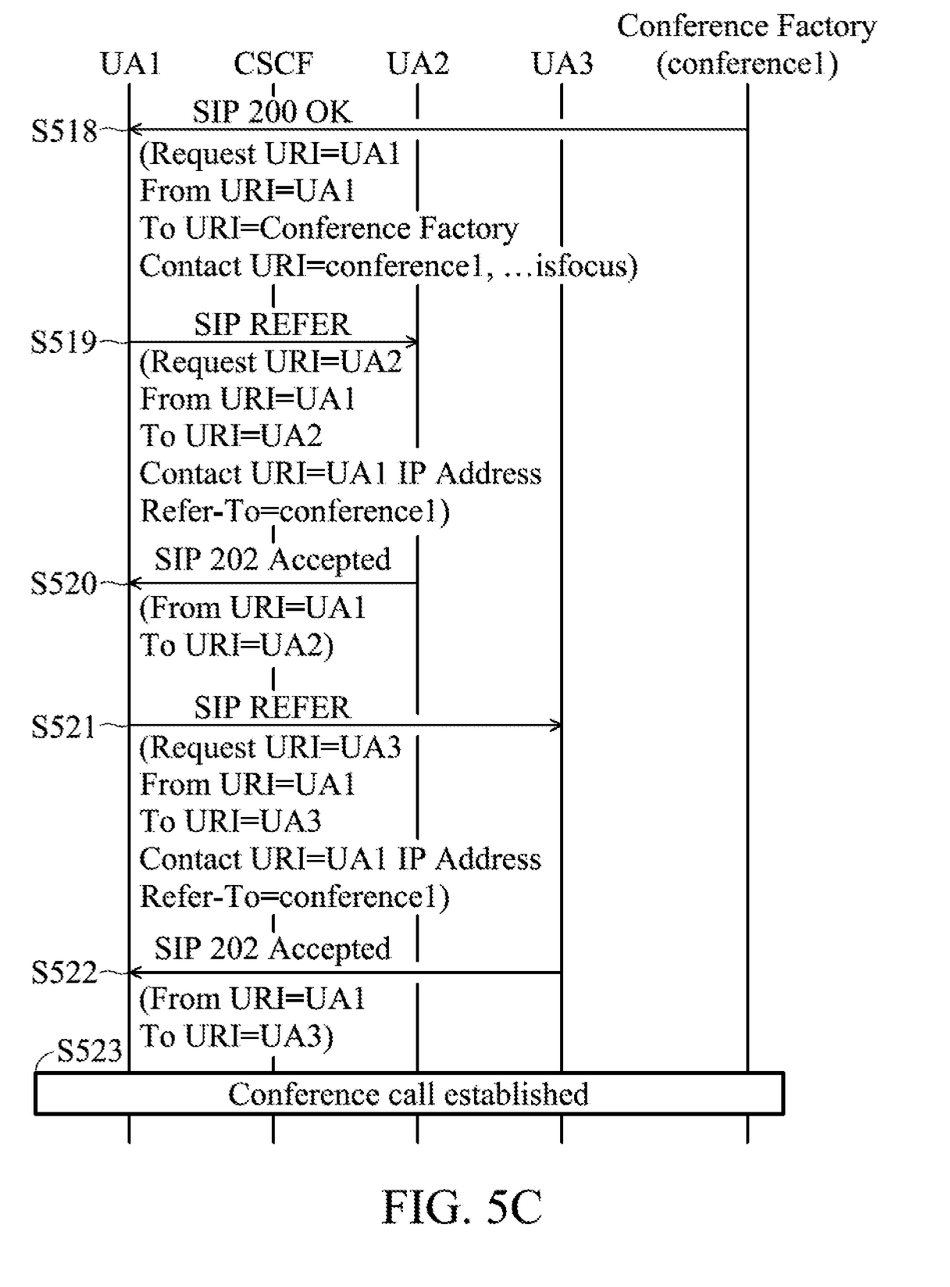

FIGS. 5A~5C show a message sequence chart illustrating the call setup flow with call addition control according to an embodiment of the application.

In steps S501~S503, UA1, UA2, and UA3 register with the CSCF, e.g., by sending SIP REGISTER message to the CSCF and receiving a 200 OK message from the CSCF.

In step S504, UA1 initiates a call to UA2.

In step S505, UA1 sends a SIP INVITE message to UA2 via the CSCF. This SIP INVITE message is used to set up a call between UA1 and UA2.

In step S506, UA1 establishes an individual call with UA2 (referred to as individual call X).

In step S507, UA1 initiates a call to UA3.

In step S508, UA1 sends a SIP INVITE message to UA2 via the CSCF. This SIP INVITE message is used to hold the call between UA1 and UA2.

In step S509, the individual call between UA1 and UA2 is put on hold.

In step S510, UA1 sends a SIP INVITE message to UA3 via the CSCF. This SIP INVITE message is used to set up a call between UA1 and UA3.

In step S511, UA1 establishes an individual call with UA3 (referred to as individual call Y).

In step S512, the user of UA1 decides to merge these two individual calls into a conference call (i.e., adding individual call Y to individual call X, or the other way around), and may apply the method for call addition control to check if the called parties of these two calls are the same. If the called parties of these two calls are not same, the call setup flow may proceed as follows. Otherwise, if the called parties of these two calls are same, the call setup flow may end here, and an alert (e.g., a text or beep) may be provided to the user of UA1 to notify of the result of call addition control.

In step S513, UA1 sends a SIP INVITE message to UA3 via the CSCF. This SIP INVITE message is used to hold the call between UA1 and UA3.

In step S514, the individual call between UA1 and UA3 is put on hold.

In step S515, UA1 sends a SIP INVITE message to a conference factory via the CSCF. This SIP INVITE message is used to create a conference call in a conference factory. In general, a conference factory is a logical entity (e.g., a server) that generates unique URI(s) to identify and represent a conference focus.

In step S516, UA1 receives a SIP 183 Session Progress message from the conference factory. This SIP 183 Session Progress message should include enough session description information to allow for a media session between UA1 and the conference factory.

In step S517, UA1 sends a SIP PRACK message to the conference factory. This SIP PRACK message acts as a provisional response acknowledgement of the reception of the SIP 183 Session Progress message.

In step S518, UA1 receives a SIP 200 OK message from the conference factory. This SIP 200 OK message is used to indicate that the call has been answered.

In step S519, UA1 sends a SIP REFER message to UA2. This SIP REFER message is used to request that the recipient (i.e., UA2) should contact a third party (i.e., the conference factory) as provided in the message.

In step S520, UA1 receives a SIP 202 Accepted message from UA2. This SIP 202 Accepted message is used to indicate that the REFER request has been accepted for processing.

In step S521, UA1 sends a SIP REFER message to UA3. This SIP REFER message is used to request that the recipient (i.e., UA3) should contact a third party (i.e., the conference factory) as provided in the message.

In step S522, UA1 receives a SIP 202 Accepted message from UA3. This SIP 202 Accepted message is used to indicate that the REFER request has been accepted for processing.

In step S523, a conference call for UA1, UA2, and UA3 is established.

Figure 6A:
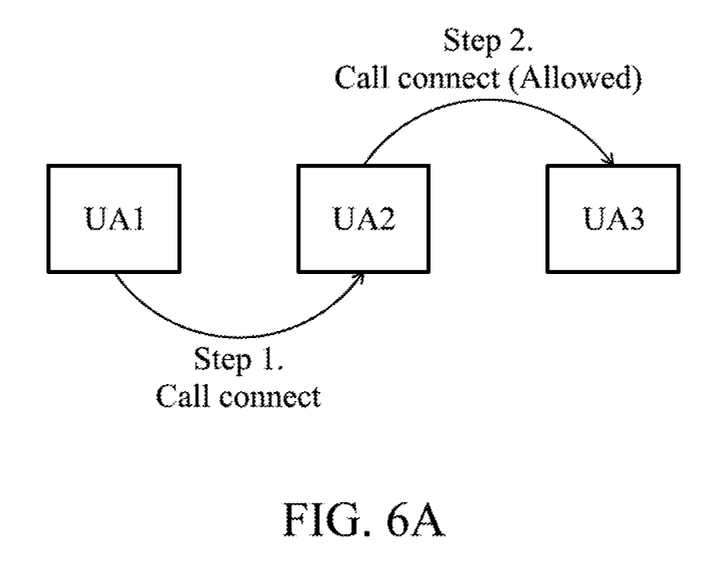
FIGS. 6A and 6B show different scenarios of call addition control in accordance with one novel aspect of the application.
Figure 6B:
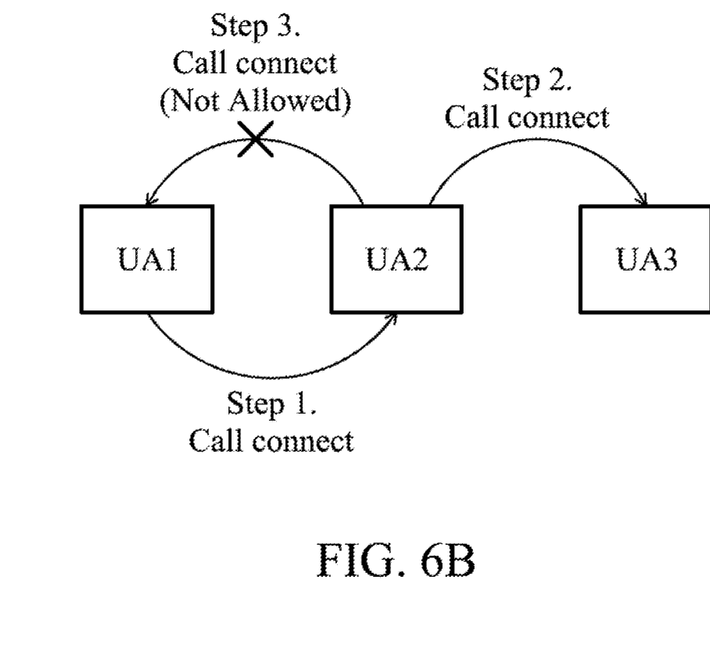

FIGS. 6A and 6B show different scenarios of call addition control in accordance with one novel aspect of the application.

As shown in FIG. 6A, UA1 makes a call to UA2 (step 1), and then UA2 invites UA3 into the call with UA1 (step 2). Please note that UA2 may first determine if UA3 is already present in the call with UA1, and allows the request of adding UA3 to the call since UA3 is not already present in the call with UA1.

As shown in FIG. 6B, UA1 makes a call to UA2 (step 1), and then UA2 invites UA3 into the call with UA1 (step 2). After that, the user of UA2 tries to add UA1 into the group call (or called conference call), but UA2 determines that UA1 is already present in the group call. In response, UA2 blocks the request of adding UA1 repeatedly into the same call (step 3). That is, the request is not allowed or restricted.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A method, comprising:
   receiving or initiating, by a User Agent (UA), a call addition request comprising information of a called party during a call;
   determining, by the UA, whether the called party is already present in the call; and
   blocking, by the UA, the call addition request in response to the called party being already present in the call.

2. The method as claimed in claim 1, wherein the call is associated with a plurality of first party identifiers, and the determination of whether the called party is already present in the call comprises:
   determining a second party identifier of the called party; and
   determining whether the first party identifiers comprise the second party identifier.

3. The method as claimed in claim 2, wherein each of the first party identifiers comprises a Uniform Resource Identifier (URI), and the second party identifier is a request URI in the call addition request which is a Session Initiation Protocol (SIP) Invite message.

4. The method as claimed in claim 2, wherein each of the first party identifiers comprises an International Mobile Equipment Identity (IMEI), and the second party identifier is an IMEI in a Contact header field of the call addition request which is an SIP Invite message.

5. The method as claimed in claim 1, wherein the UA initiates or joins the call through a landline or a wireless communication network comprising a Wireless-Fidelity (Wi-Fi) network or a cellular network.

6. The method as claimed in claim 1, wherein the call is coordinated by a call service system.

7. The method as claimed in claim 6, wherein the call service system comprises an IP Multimedia Subsystem (IMS) network.

8. The method as claimed in claim 1, wherein the UA initiates or joins the call using a first subscriber identity, and the call addition request is received or initiated using the first subscriber identity or a second subscriber identity.

9. A UA, comprising:
   a transceiver, configured to perform transmission and reception to and from a communication network; and
   a controller, coupled to the transceiver, and configured to initiate or join a call through the communication network, receive or initiate a call addition request comprising information of a called party during the call, determine whether the called party is already present in the call, and block the call addition request in response to the called party being already present in the call.

10. The method as claimed in claim 9, wherein the call is associated with a plurality of first party identifiers, and the determination of whether the called party is already present in the call comprises:
    determining a second party identifier of the called party; and
    determining whether the first party identifiers comprise the second party identifier.

11. The method as claimed in claim 10, wherein each of the first party identifiers comprises a URI, and the second party identifier is a request URI in the call addition request which is an SIP Invite message.

12. The method as claimed in claim 10, wherein each of the first party identifiers comprises an IMEI, and the second party identifier is an IMEI in a Contact header field of the call addition request which is an SIP Invite message.

13. The method as claimed in claim 9, wherein the call is coordinated by a call service system.

14. The method as claimed in claim 13, wherein the call service system comprises an IMS network.

15. The method as claimed in claim 9, wherein the controller initiates or joins the call using a first subscriber identity, and the call addition request is received or initiated using the first subscriber identity or a second subscriber identity.

16. A method, comprising:
    receiving or initiating, by a call service system, a call addition request comprising information of a called party from a UA during a call;
    determining, by the call service system, whether the called party is already present in the call; and
    blocking, by the call service system, the call addition request in response to the called party being already present in the call.

17. The method as claimed in claim 16, wherein the call is associated with a plurality of first party identifiers, and the determination of whether the called party is already present in the call comprises:
    determining a second party identifier of the called party; and
    determining whether the first party identifiers comprise the second party identifier.

18. The method as claimed in claim 17, wherein each of the first party identifiers comprises a URI, and the second party identifier is a request URI in the call addition request which is an SIP Invite message.

19. The method as claimed in claim 17, wherein each of the first party identifiers comprises an IMEI, and the second party identifier is an IMEI in a Contact header field of the call addition request which is an SIP Invite message.

20. The method as claimed in claim 16, wherein the call service system comprises an IMS network.

* * * * *